United States Patent
Choi et al.

(10) Patent No.: US 11,177,701 B2
(45) Date of Patent: Nov. 16, 2021

(54) WIRELESS POWER TRANSMITTING DEVICE AND METHOD FOR SUPPLYING WIRELESS POWER THEREOF

(71) Applicant: SAMSUNG ELECTRONICS CO., LTD., Suwon-si (KR)

(72) Inventors: Youngho Choi, Suwon-si (KR); Jeongil Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/834,119

(22) Filed: Mar. 30, 2020

(65) Prior Publication Data
US 2020/0336022 A1 Oct. 22, 2020

(30) Foreign Application Priority Data
Apr. 16, 2019 (KR) .................... 10-2019-0044443

(51) Int. Cl.
*H02J 5/00* (2016.01)
*H02J 7/00* (2006.01)
(Continued)

(52) U.S. Cl.
CPC ............ *H02J 50/80* (2016.02); *G08B 21/023* (2013.01); *G08B 21/0219* (2013.01);
(Continued)

(58) Field of Classification Search
None
See application file for complete search history.

(56) References Cited

U.S. PATENT DOCUMENTS

| 8,129,864 B2* | 3/2012 | Baarman | H02J 50/10 307/104 |
| 8,729,734 B2* | 5/2014 | Cook | H01Q 1/1285 307/104 |

(Continued)

FOREIGN PATENT DOCUMENTS

| KR | 10-2018-0095445 | 8/2018 |
| KR | 10-2018-0117512 | 10/2018 |

(Continued)

OTHER PUBLICATIONS

Search Report and Written Opinion dated Jul. 13, 2020 in counterpart International Patent Application No. PCT/KR2020/004709.
(Continued)

*Primary Examiner* — Kenneth B Wells
(74) *Attorney, Agent, or Firm* — Nixon & Vanderhye P.C.

(57) ABSTRACT

A wireless power transmitting device is disclosed. The wireless power transmitting device includes a first communicator comprising communication circuitry configured to communicate with a wireless power receiving device, a wireless power transmitter configured to supply wireless power to the wireless power receiving device, and a first controller configured to control the wireless power transmitter to supply initiating power for obtaining wireless power efficiency to the wireless power receiving device and to control the wireless power transmitter to supply driving power for driving an electronic device including the wireless power receiving device to the wireless power receiving device based on the wireless power efficiency being a predetermined value or greater based on information received from the wireless power receiving device through the first communicator.

20 Claims, 18 Drawing Sheets

(51) Int. Cl.
*H02J 50/10* (2016.01)
*H02J 50/40* (2016.01)
*H02J 50/80* (2016.01)
*H02J 50/70* (2016.01)
*G08B 21/02* (2006.01)

(52) U.S. Cl.
CPC .......... *G08B 21/0277* (2013.01); *H02J 50/10* (2016.02); *H02J 50/70* (2016.02)

(56) References Cited

U.S. PATENT DOCUMENTS

| | | |
|---|---|---|
| 8,803,476 B2 | 8/2014 | Vorenkamp et al. |
| 9,800,061 B2 * | 10/2017 | Takahashi ............... H02J 50/80 |
| 9,866,071 B2 * | 1/2018 | Niizuma ................. H02J 50/10 |
| 9,985,695 B2 | 5/2018 | Won et al. |
| 10,263,473 B2 * | 4/2019 | DeBaun ................ B60L 53/122 |
| 10,763,686 B2 * | 9/2020 | Bae ........................ G06F 3/0395 |
| 2009/0127937 A1 * | 5/2009 | Widmer ................ H02J 50/005 |
| | | 307/149 |
| 2012/0306285 A1 | 12/2012 | Kim et al. |
| 2014/0354041 A1 | 12/2014 | Yoshi et al. |
| 2017/0018973 A1 | 1/2017 | Murayama et al. |
| 2018/0226187 A1 | 8/2018 | Bien et al. |
| 2018/0287413 A1 | 10/2018 | Jung |
| 2018/0323650 A1 | 11/2018 | Choi et al. |

FOREIGN PATENT DOCUMENTS

| | | |
|---|---|---|
| KR | 10-1910194 | 10/2018 |
| KR | 10-2018-0122208 | 11/2018 |
| KR | 10-2019-0000619 | 1/2019 |
| WO | 2013/069951 | 5/2013 |
| WO | 2014/171349 | 10/2014 |

OTHER PUBLICATIONS

Extended Search Report and Written Opinion dated Jun. 24, 2020 in counterpart European Patent Application No. 20166088.3.
European Office Action dated Feb. 22, 2021 for EP Application No. 20166088.3.

\* cited by examiner

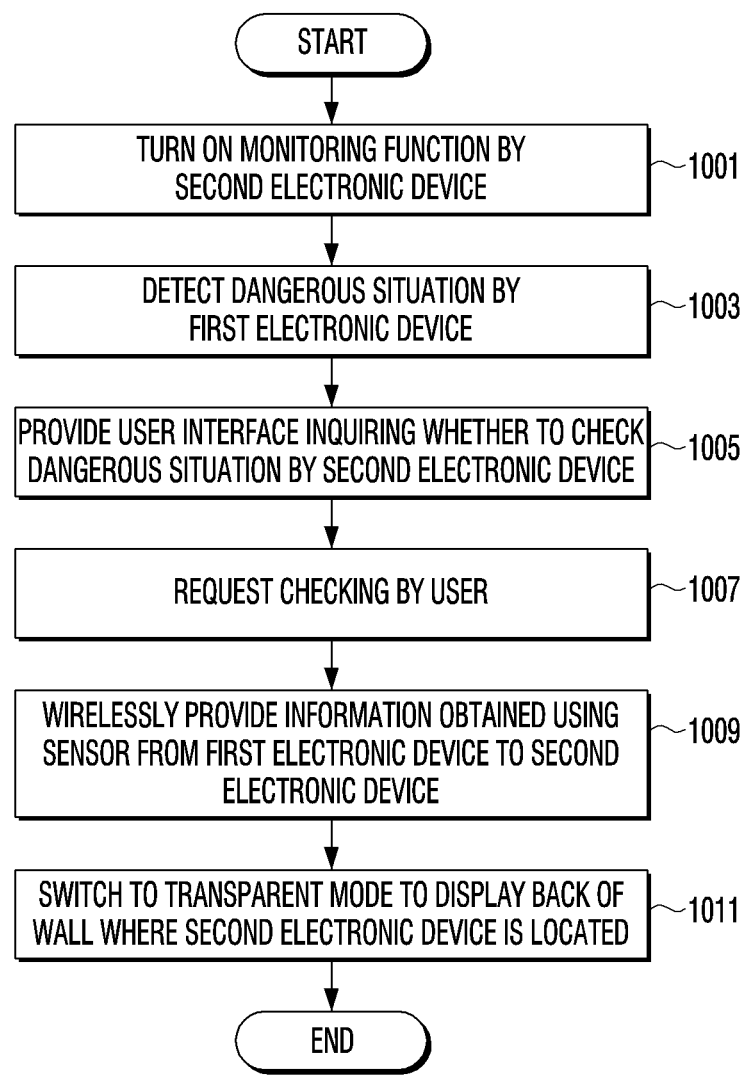

WIRELESS POWER TRANSMITTING DEVICE AND METHOD FOR SUPPLYING WIRELESS POWER THEREOF

CROSS-REFERENCE TO RELATED APPLICATION

This application is based on and claims priority under 35 U.S.C. § 119 to Korean Patent Application No. 10-2019-0044443, filed on Apr. 16, 2019, in the Korean Intellectual Property Office, the disclosure of which is incorporated by reference herein in its entirety.

BACKGROUND

Field

The disclosure relates to a wireless power transmitting device and a method for supplying power to an electronic device using the same.

Description of Related Art

A wireless power system may include a wireless power transmitting device that wirelessly transmits power for driving an electronic device and a wireless power receiving device that receives wireless power from the wireless power transmitting device. For example, wireless power may be supplied from the wireless power transmitting device connected to a power source to the wireless power receiving device connected to a functional part of an electronic device.

There may be a difference in efficiency of wireless power transmitted and received according to a distance between the wireless power transmitting device and the wireless power receiving device. Further, even if the distance between the wireless power transmitting device and the wireless power receiving device is fixed, impedance of a load may be changed according to an ON/OFF state of the functional part of the electronic device connected to the wireless power receiving device to cause a difference in efficiency of wireless power being transmitted and received. In addition, if a wireless power transmission coil of the wireless power transmitting device and a wireless power reception coil of the wireless power receiving device are not aligned correctly, the efficiency of wireless power may be deteriorated.

Therefore, various studies have continued to increase efficiency of power transmitted and received wirelessly.

To obtain maximum wireless power efficiency, the wireless power transmission coil of the wireless power transmitting device and the wireless power reception coil of the wireless power receiving device need to be aligned with each other. Generally, the wireless power transmitting device and the wireless power receiving device may be integrally provided or combined along a previously fixed guide portion so that the wireless power transmission coil of the wireless power transmitting device and the wireless power reception coil of the wireless power receiving device are aligned. However, if a structure (e.g., a wall, etc.) exists between the wireless power transmitting device and the wireless power receiving device, it may be difficult for a user to arrange the wireless power transmitting device and the wireless power receiving device to maximize wireless power efficiency. In particular, if the wireless power transmitting device and the wireless power receiving device are not properly arranged, wireless efficiency may be wasted and electromagnetic interference (EMI) may occur due to a leakage magnetic field.

SUMMARY

Embodiments of the disclosure address the above disadvantages and other disadvantages not described above.

The disclosure provides a method and apparatus for addressing the above problem.

According to an example embodiment of the disclosure, a wireless power transmitting device includes: a first communicator comprising communication circuitry configured to communicate with a wireless power receiving device; a wireless power transmitter comprising power transmitting circuitry configured to supply wireless power to the wireless power receiving device; and a first controller configured to control the wireless power transmitter to supply initiating power for obtaining wireless power efficiency to the wireless power receiving device and to control the wireless power transmitter to supply driving power for driving an electronic device including the wireless power receiving device to the wireless power receiving device based on the wireless power efficiency being a predetermined value or greater based on information received from the wireless power receiving device through the first communicator.

According to another example embodiment of the disclosure, a wireless power receiving device includes: a second communicator comprising communication circuitry configured to communicate with a wireless power transmitting device; a wireless power receiver configured to receive wireless power from the wireless power transmitting device; and a second controller configured to obtain wireless power efficiency based on information received from the wireless power receiver through the second communicator based on initiating power supplied from the wireless power receiver, and to control driving power output from the wireless power receiver to be provided to an electronic device based on the obtained wireless power efficiency being a predetermined value or greater.

According to another example embodiment of the disclosure, a method of supplying wireless power using a wireless power transmitting device includes: supplying initiating power for obtaining wireless power efficiency to a wireless power receiving device; receiving information related to the wireless power efficiency from the wireless power receiving device; and supplying driving power for driving an electronic device including the wireless power receiving device to the wireless power receiving device based on the wireless power efficiency being a predetermined value or greater based on the received information.

According to another example embodiment of the disclosure, a method of supplying power to a wireless power receiving device includes: receiving initiating power for obtaining wireless power efficiency from a wireless power transmitting device; receiving information related to wireless power efficiency from the wireless power transmitting device; obtaining wireless power efficiency based on the received information; and providing driving power to an electronic device including the wireless power receiving device based on the obtained wireless power efficiency being a predetermined value or greater.

According to the disclosure, the first electronic device and the second electronic device may be arranged such that efficiency of wireless power is maximized and/or improved. Accordingly, a waste of wireless power efficiency that may occur when the wireless power transmission coil of the first electronic device and the wireless power reception coil of the second electronic device are not aligned with each other, a problem of electromagnetic interference (EMI) due to a leakage magnetic field, and/or a malfunction phenomenon (e.g., a hang-up phenomenon) in the wireless power receiving device that receives wireless power may be prevented and/or reduced.

For example, wireless power efficiency information indicating a magnitude of wireless power efficiency may be provided according to an alignment state between the wireless power transmission coil of the first electronic device and the wireless power reception coil of the second electronic device. Therefore, a user may arrange the first electronic device and the second electronic device to obtain maximum wireless power efficiency with reference to the wireless power efficiency information. For example, in a situation where a structure (e.g., a wall) is located between the first electronic device and the second electronic device making it difficult to visually estimate alignment of the first electronic device and the second electronic device, the magnitude of the wireless power efficiency may be provided in an intuitive form such as, for example, a number of LEDs which are turned on, and thus, the user may easily arrange the first electronic device and the second electronic device to have maximum and/or improved wireless power efficiency.

In addition, various other effects directly or indirectly identified through this disclosure may be provided.

Additional and/or other aspects and advantages of the disclosure will be set forth in part in the description which follows and, in part, will be apparent from the description.

BRIEF DESCRIPTION OF THE DRAWINGS

The above and/or other aspects, features and advantages of certain embodiments of the present disclosure will be more apparent from the following detailed description, taken in conjunction with the accompanying drawings, in which:

FIG. 10 is a flowchart illustrating an example process of providing a child care service according to an embodiment;

DETAILED DESCRIPTION

Figure 1A:
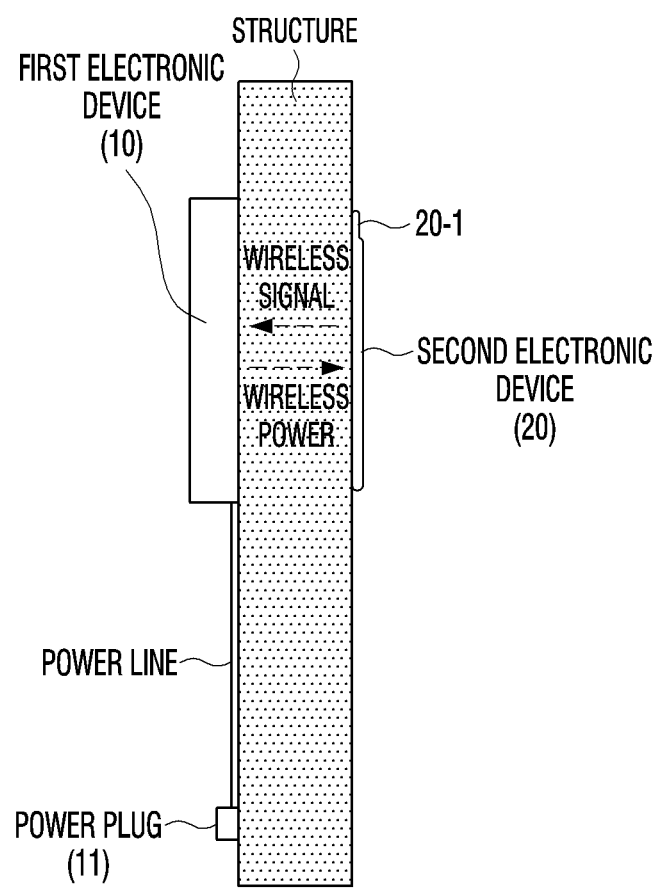
FIGS. 1A and 1B are diagrams illustrating an example system according to an embodiment.

Various example embodiments of the present disclosure may be diversely modified. Accordingly, various example embodiments are illustrated in the drawings and are described in greater detail in the disclosure. However, it is to be understood that the present disclosure is not limited to a specific example embodiment, and includes all modifications, equivalents, and substitutions without departing from the scope and spirit of the present disclosure. Also, well-known functions or constructions may not described in detail where they would obscure the disclosure with unnecessary detail.

It should be appreciated that various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations (e.g., and/or) of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

Figure 1B:
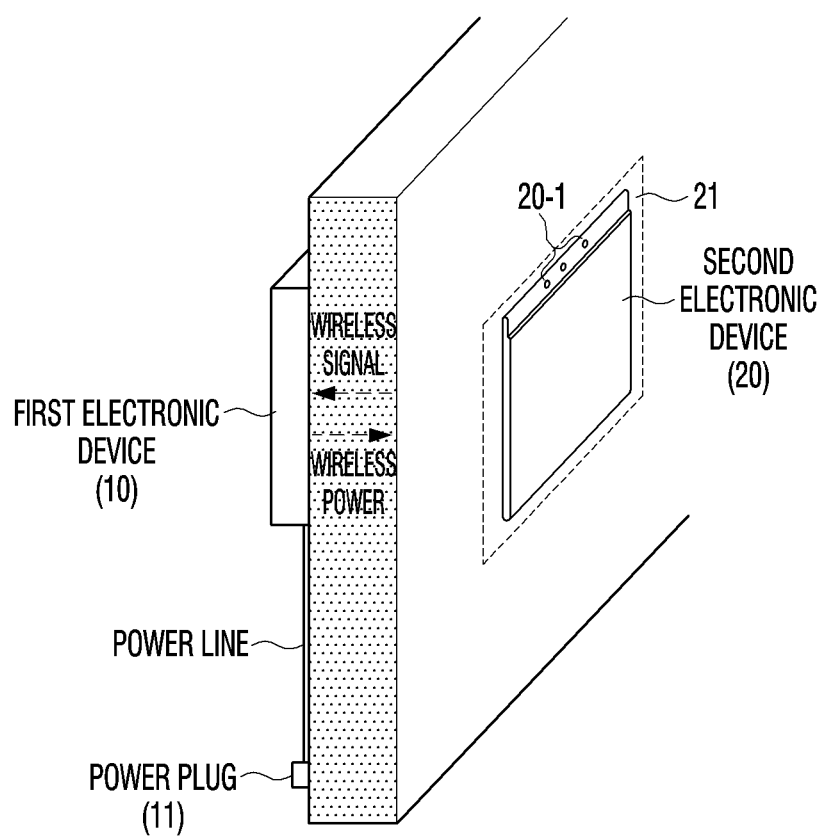

FIGS. 1A and 1B are diagrams illustrating an example system according to an embodiment.

In FIG. 1, a system may include a first electronic device 10 and a second electronic device 20.

FIG. 1A is a side view of the system and FIG. 1B is a perspective view of the system.

The first electronic device 10 and the second electronic device 20 may be located to be aligned with each other based on a structure (e.g., a wall). Referring to FIGS. 1A and 1B, for example, a display device may be disposed as an example of the first electronic device 10 on one surface of a structure, and a display device including at least one sensor 20-1 as an example of the second electronic device 20 may be disposed on another surface of the structure. The display device may be, for example, and without limitation, a digital TV, an electronic picture frame, an electronic blackboard, a signage, a monitor, or the like, and the at least one sensor 20-1 may include, for example, and without limitation, a camera, a microphone, various sensors (a wind speed sensor, a fine dust sensor, a temperature sensor, a gas sensor, etc.), or the like. The first electronic device 10 and the second electronic device 20 are not limited to the embodiment illustrated in FIGS. 1A and 1B and may be various types of devices. For example, at least one of the first electronic device 10 and the second electronic device 20 may include, for example, and without limitation, a portable communication device (e.g., a smartphone), a computer device, a multimedia device, a medical device, a speaker, a wearable device, Internet of Things (IoT) device, a home appliance, or the like.

In FIGS. 1A and 1B, the first electronic device 10 may receive power from a wall power source through a power plug 11, and the supplied power may be, for example, alternate current (AC) power. The first electronic device 10 may convert the supplied AC power into direct current (DC) power and supply the DC power to each component of the electronic device 10. The second electronic device 20 may not be able to use the wall power source. For example, if a place where the second electronic device 20 is installed outside, it may be difficult to use the wall power source due to a risk of a short circuit or an electric shock in rainy weather. Wiring may be avoided in consideration of the interior, aesthetics, safety, and the like.

Figure 2:
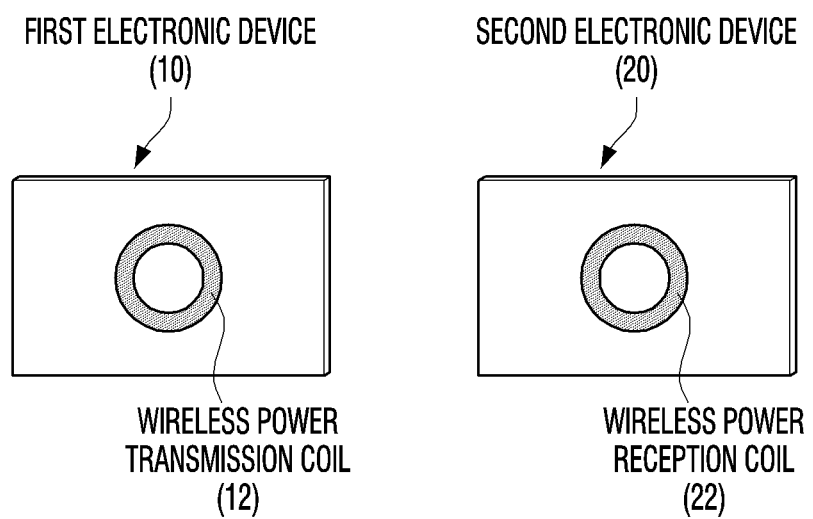
FIG. 2 is a diagram illustrating an example first electronic device and an example second electronic device each including a wireless power coil according to an embodiment.

Accordingly, to cope with example situations including, without limitation, the examples enumerated above, the first electronic device 10 may be supplied with power by wire through a power plug 11, while the second electronic device 20 may be supplied with power through a power supply area 21 (e.g., a wireless power receiving device of this disclosure) based on a wireless power transmission method. For example, the first electronic device 10 supplied with power by wire may supply power to the second electronic device 20 using the wireless power transmission method. To this end, as shown in FIG. 2, each of the first electronic device 10 and the second electronic device 20 may have a wireless power coil. The first electronic device 10 transmitting wireless power may include a wireless power transmission coil 12, and the second electronic device 20 receiving wireless power may include a wireless power reception coil 22.

If wireless power is transmitted in a state where the wireless power transmission coil 12 and the wireless power reception coil 22 are not aligned with each other, wireless power efficiency may be significantly reduced. In addition, EMI due to a leakage magnetic field may occur or a malfunction (e.g., a hang-up phenomenon) may occur in a wireless power receiving device that receives wireless power.

Figure 3:
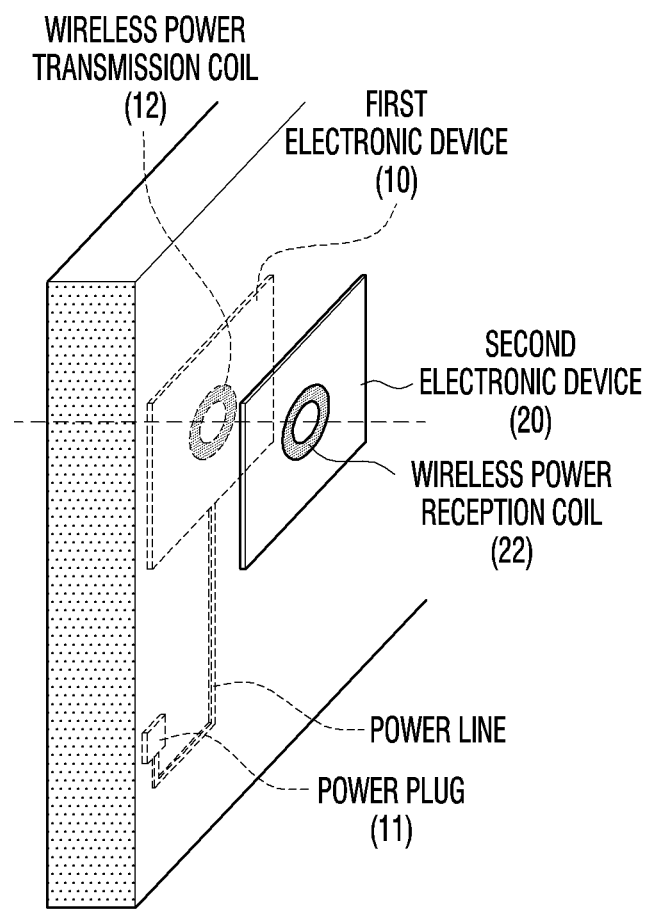
FIG. 3 is a diagram illustrating an example in which a first electronic device and a second electronic device are aligned according to an embodiment.

Accordingly, as shown in FIG. 3, positions of the wireless power transmission coil 12 and the wireless power reception coil 22 need to be aligned with each other.

Figure 4A:
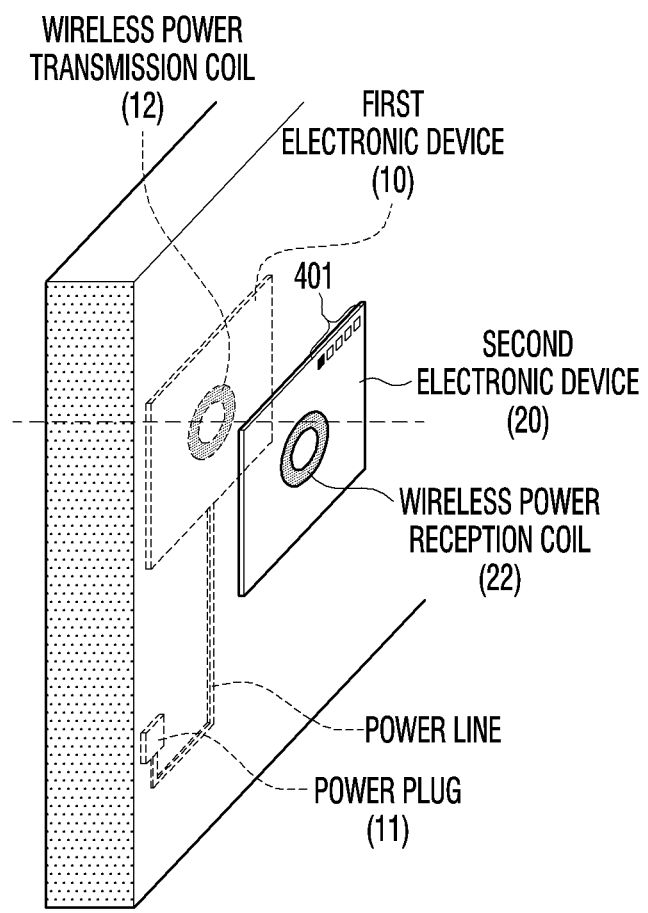
FIGS. 4A and 4B are diagrams illustrating example systems including a plurality of LEDs according to an embodiment.
Figure 4B:
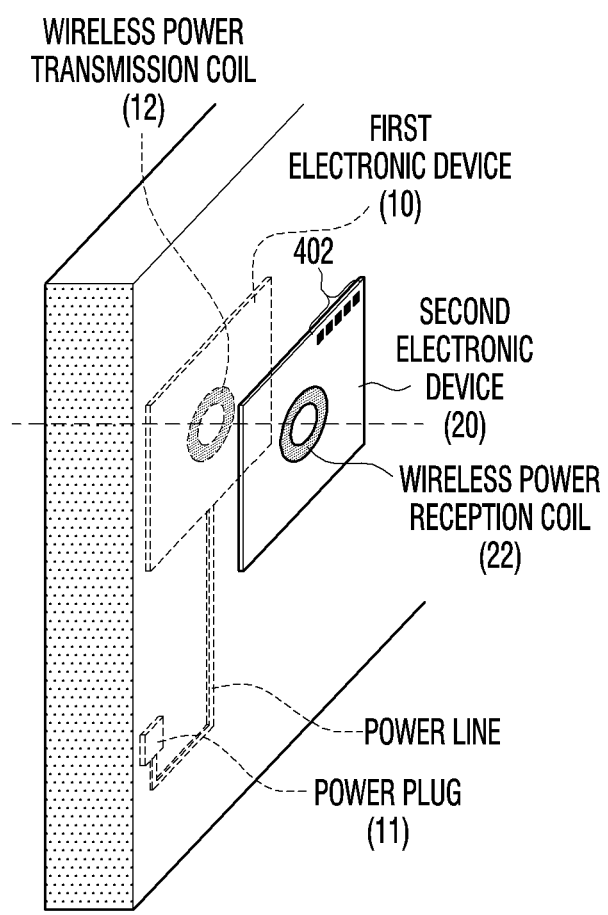

To align the positions of the wireless power transmission coil 12 and the wireless power reception coil 22, the first electronic device 10 or the second electronic device 20 may provide wireless power efficiency information 401 and 402 indicating magnitudes of wireless power efficiency as illustrated in FIGS. 4A and 4B.

In FIGS. 4A and 4B, the wireless power efficiency information may include, for example, and without limitation, a lighting degree (or lighting level) provided by a plurality of LEDs, but is not limited to the example described above and various types of wireless power efficiency information are provided. For example, the wireless power efficiency information may include, for example, and without limitation, the number of times at least one LED is turned on, a lighting speed of at least one LED, a volume of sound provided by the speaker, intensity of haptic provided by a vibrator, a graphic provided by a display, and the like, but are not limited to these examples and may be provided in various forms.

FIG. 4A illustrates wireless power efficiency information provided through a plurality of LEDs when wireless power efficiency is low because positions of the wireless power transmission coil 12 and the wireless power reception coil 22 are not aligned with each other, and FIG. 4B illustrates wireless power efficiency information provided through a plurality of LEDs when wireless power efficiency is high because the positions of the wireless power transmission coil and the wireless power reception coil are aligned with each other. Referring to FIGS. 4A and 4B, the number of lighted LEDs (e.g., the number of LEDs which are turned on) may increase as the wireless power efficiency increases.

A user may arrange the positions of the wireless power transmission coil 12 and the wireless power reception coil 22 with reference to the wireless power efficiency information. For example, the user may check whether the number of LEDs that are turned on increases while moving a position where the first electronic device 10 including the wireless power transmission coil or the second electronic device 20 including the wireless power reception coil is installed. When all of the plurality of LEDs are turned on at a certain position, the user may determine that the positions of the wireless power transmission coil and the wireless power reception coil are aligned so that wireless power efficiency is substantially maximized, and fix a position of at least one of the first electronic device 10 and the second electronic device 20. Accordingly, even in a situation where the structure is centered, the user may find out a position having the best wireless power efficiency between the first electronic device 10 and the second electronic device 20 and install the first electronic device 10 and the second electronic device 20.

Aligning the wireless power transmission coil and the wireless power reception coil such that the wireless power efficiency is maximized and/or improved may include aligning the wireless power transmission coil and the wireless power reception coil such that a wireless power efficiency value is a predetermined value or greater. The wireless power efficiency value may vary depending on an installation environment of the first electronic device 10 and the second electronic device 20. For example, if a thickness of a structure between the first electronic device 10 and the second electronic device 20 is about 30 centimeters, a maximum value of the wireless power efficiency may fall between about 80% and 90%. Meanwhile, flickering levels of the plurality of LEDs may be classified according to wireless power efficiency values. For example, if a lookup table already exists, the flickering levels of the LEDs may be determined with reference to the lookup table. For example, and without limitation, in case of five LEDs, one LED is turned on when the wireless power efficiency is 20% or less, two LEDs are turned on when the wireless power efficiency exceeds 20% or 40% or less, three LEDs are turned on when the wireless power efficiency exceeds 40% or 60% or less, four LEDs are turned on when the wireless power efficiency exceeds 60% or 80% or less, etc., and a plurality of LEDs may all be turned on when the wireless power efficiency exceeds 80%.

Figure 5A:
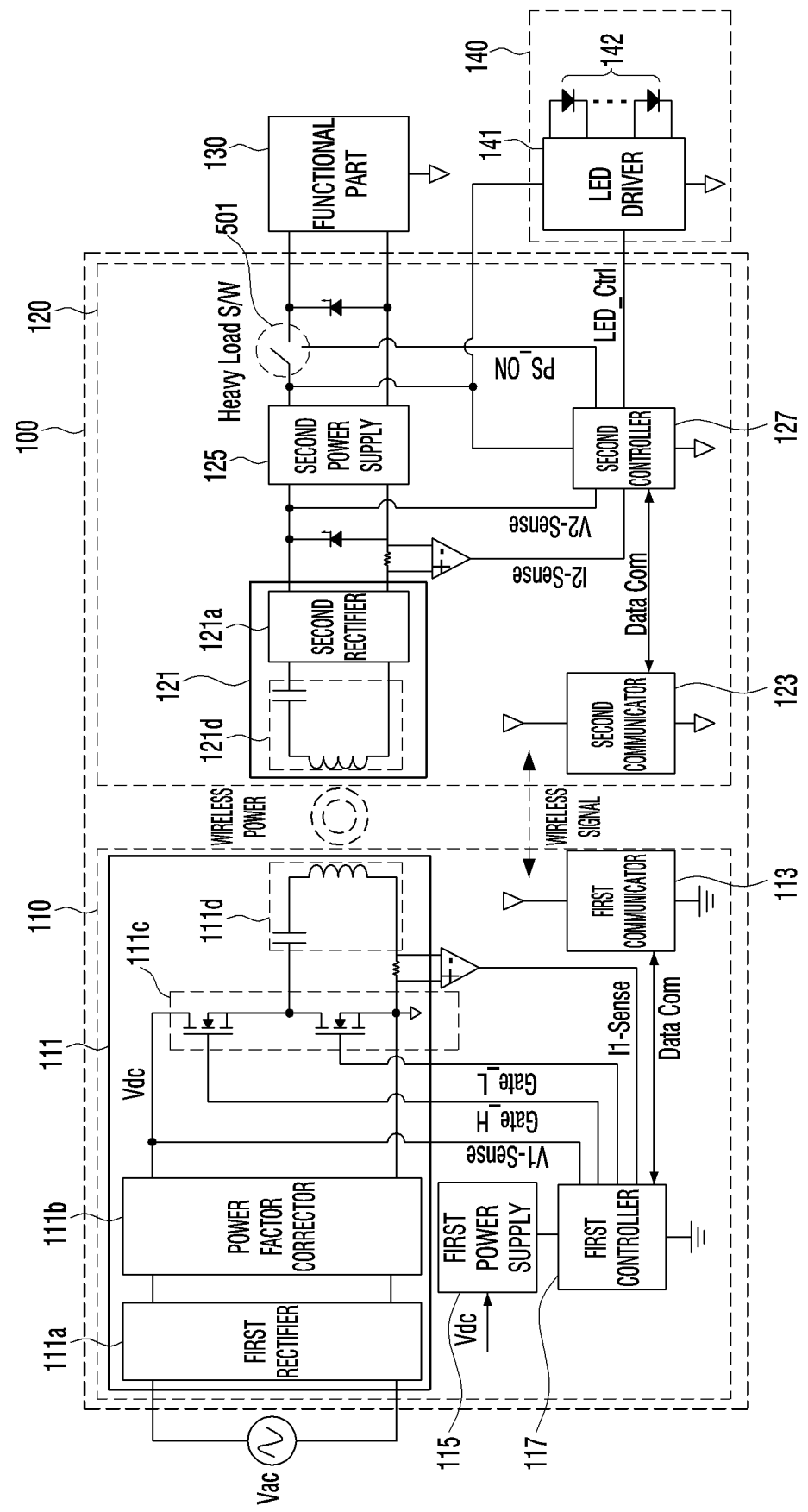
FIG. 5A is a block diagram illustrating an example configuration of a wireless power system according to an embodiment.

FIG. 5A is a block diagram illustrating an example configuration of a wireless power system according to an embodiment.

The wireless power system 100 may include a wireless power transmitting device 110 transmitting power and a wireless power receiving device 120 receiving power. In this example, the wireless power transmitting device 110 may be provided in the first electronic device 10, and the wireless power receiving device 120 may be provided in the second electronic device 20.

In FIG. 5A, the wireless power transmitting device 110 may include a wireless power transmitter 111, a first controller (e.g., including processing or control circuitry) 117, a first communicator (e.g., including communication circuitry) 113, and a first power supply 115.

The wireless power transmitter 111 may wirelessly transmit power to the wireless power receiving device 120. The wireless power transmitter 111 may include a first rectifier 111a, a power factor corrector (PFC) 111b, an inverter 111c, and a transmission resonator 111d.

The first rectifier 111a may convert AC power received from an external power source into DC power. For example, the first rectifier 111a may include a rectifying circuit for rectifying AC power. The rectifying circuit may be, for example, a bridge circuit (e.g., a bridge diode circuit) that rectifies the received AC power and converts the AC power into DC power.

The power factor corrector 111b may include circuitry to adjust a power factor of the DC power input from the first rectifier 111a and output a DC voltage. The power factor corrector 111b may minimize and/or reduce reactive power by correcting a phase and shape of the DC power input from the first rectifier 111a. The power factor corrector 111b may output the DC voltage through a capacitor (or smoothing capacitor) connected to an output terminal.

The inverter 111c may generate power transmitted to the wireless power receiving device 120 by converting the DC voltage input from the power factor corrector 111b into an AC voltage. In addition, the inverter 111c may include a power amplifier amplifying the generated voltage.

In FIG. 5A, the inverter 111c may include a vertical switch in the form of a half bridge. The vertical switch may include, for example, a switching transistor (e.g., a MOSFET). In this case, a duty ratio of the inverter 111c may be adjusted under the control of the first controller 117. The duty ratio may refer, for example, to a ratio between a turn-off period and a turn-on period of the switching transistor. For example, the duty ratio may be a turn-on period/turn-off period or a turn-on period/(turn-on period+turn-off period).

The transmission resonator 111d may convert the AC power input from the inverter 111c into electromagnetic energy and transmit the converted electromagnetic energy to the wireless power receiving device 120. For example, the transmission resonator 111d may include a wireless power transmission coil having a specified resonance frequency. The wireless power transmission coil may include, for example, and without limitation, at least one of a resistor, an inductor, a capacitor, or the like. The transmission resonator 111d may generate electromagnetic energy using the AC power through the wireless power transmission coil and transmit the electromagnetic energy to a resonator of the wireless power receiving device 120 to transmit power.

The first communicator 113 may include various communication circuitry and transmit/receive a wireless signal with a second communicator 123 of the wireless power receiving device 120. For example, the first communicator 113 and the second communicator 123 may transmit/receive a wireless signal according, for example, and without limitation, to a short-range wireless communication method (e.g., Bluetooth, near-field communication (NFC), Wi-Fi, etc.). According to an embodiment, the first communicator 113 may transmit a power value of the wireless power transmitting device 110 to the second communicator 123 or receive a power value of the wireless power receiving device 120 from the second communicator 123.

The first power supply 115 may supply the DC power output from the power factor corrector 111b to at least one of the components of the wireless power transmitting device 110. For example, the first power supply 115 may supply DC power to the first controller 117.

The first controller 117 may include various processing or control circuitry and control an overall operation of the wireless power transmitting device 110.

In an embodiment, the first controller 117 may control the wireless power transmitter 111 to supply driving power required for driving the second electronic device 20 including the wireless power receiving device 120 to the wireless power receiving device 120 in a situation where wireless power efficiency is a predetermined value or greater based on information received from the wireless power receiving device 120 through the first communicator 113. The information received from the wireless power receiving device 120 may include a wireless power efficiency value between the wireless power receiving device 120 and the wireless power transmitting device 110. In addition, the first controller 117 may control the wireless power transmitter 111 to supply initiating power to the wireless power receiving device 120 until the wireless power efficiency reaches the predetermined value or greater to prevent and/or reduce a leakage magnetic field.

In an embodiment, when the wireless power efficiency is the predetermined value or greater according to alignment between the wireless power transmission coil included in the wireless power transmitting device 110 and the wireless power reception coil included in the wireless power receiving device 120, the first controller 117 may control the wireless power transmitter 111 to supply driving power to the wireless power receiving device 120.

In an embodiment, the first controller 117 may control initiating power or driving power to be supplied to the wireless power receiving device 120 by adjusting a duty ratio of the inverter 111c included in the wireless power transmitter 111.

The wireless power receiving device 120 may wirelessly receive power from the wireless power transmitting device 110 to operate a functional part 130 for an operation of the second electronic device 20. The wireless power receiving device 120 may include a wireless power receiver 121, a second communicator (e.g., including communication circuitry) 123, a power supply 125, and a second controller (e.g., including processing or control circuitry) 127.

The wireless power receiver 121 may wirelessly receive power from the wireless power transmitting device 110. The wireless power receiver 121 may include a reception resonator 121d and a second rectifier 121a.

The reception resonator 121d may receive electromagnetic energy from the wireless power transmitting device 110. For example, the reception resonator 121d may include a wireless power reception coil having a specified resonance frequency. The wireless power reception coil may include, for example, and without limitation, at least one of a resistor, an inductor, a capacitor, or the like. The reception resonator 121d may receive electromagnetic energy generated by the transmission resonator 111d of the wireless power transmitting device 110 through the wireless power transmission coil, and generate AC power using the electromagnetic energy.

The second rectifier 121a may convert the AC power received from the wireless power transmitting device 110 into DC power. The second rectifier 121*a* may have a configuration similar to that of the first rectifier 111*a* of the wireless power transmitter 111 of the wireless power transmitting device 110. For example, the second rectifier 121*a* may include a rectifying circuit rectifying AC power.

The second communicator 123 may include various communication circuitry and transmit/receive a wireless signal with the first communicator 113 of the wireless power transmitting device 110. According to an embodiment, the second communicator 123 may transmit a power value of the wireless power receiving device 120 to the first communicator 113 or receive a power value of the wireless power transmitting device 110 from the first communicator 113.

The second power supply (or DC/DC converter) 125 may supply the DC power received from the wireless power receiver 121 to the functional part 130. The second power supply 125 may supply DC power suitable for a specification of a load of the functional part 130 to the functional part 130.

The second controller 127 may include various processing or control circuitry and control an overall operation of the wireless power receiving device 120. For example, the second controller 127 may control power supplied from the second power supply 125 to the functional part 130.

In an embodiment, as initiating power is supplied from the wireless power transmitting device 110, the second controller 127 may obtain wireless power efficiency based on information received from by the wireless power receiving device 120 through the second communicator 123, and when the obtained wireless power efficiency is the predetermined value or greater, the second controller 127 may control driving power output from the wireless power receiving device 120 to be provided to the functional part 130 of the second electronic device 20. For example, when the wireless power efficiency is the predetermined value or greater as the wireless power transmission coil included in the wireless power transmitting device 110 and the wireless power reception coil included in the wireless power receiving device 120 are aligned with each other, the second controller 127 may control driving power through the wireless power receiver 121 to be provided to the functional part 130 of the second electronic device 20.

In an embodiment, the second controller 127 may turn on a heavy load switch between the wireless power receiving device 120 and the functional part 130 so that driving power may be provided to the functional part 130 of the second electronic device 20.

In an embodiment, as a control signal for turning on the heavy load switch is received from the wireless power transmitting device through the second communicator 123, the second controller 127 may turn on the switch between the wireless power receiver and the functional part so that driving power may be provided to the functional part of the electronic device.

In an embodiment, the second controller 127 may transmit a control signal related to the obtained wireless power efficiency to a user interface 140 providing wireless power efficiency information. The user interface 140 may provide wireless power efficiency information using a plurality of LEDs according to the received control signal.

The second electronic device 20 may further include the functional part 130 and the user interface 140 as well as the wireless power receiving device 120. The functional part 130 may include a component that executes at least one function of the second electronic device 20 and may include, for example, a processor and a memory. The functional part 130 may receive power for applying a current and/or voltage to each of the components of the second electronic device 20 from the wireless power receiving device 120. If the second electronic device 20 is a display device that displays an image, the functional part 130 may include a panel driving circuit and a control circuit. The panel driving circuit may apply, for example, a current to, for example, and without limitation, a display panel (e.g., a liquid crystal display (LCD) panel, a plasma display panel (PDP), a light emitting diode (LED) panel) according to a control signal received from the control circuit. The control circuit may generate a control signal corresponding to an image to be displayed on the display, and apply a current to the panel driving circuit according to the generated control signal. In addition, when the display panel is an LCD panel, the functional part 130 may further include a backlight driving circuit for driving a backlight. The backlight driving circuit may apply a voltage for operating the backlight to the backlight.

The user interface 140 may include a component for providing wireless power efficiency information. The user interface 140 may include, for example, and without limitation, an LED driver 141 and a plurality of LEDs 142. In this case, the LED driver 141 may control at least one of the plurality of LEDs 142 to be turned on based on a control signal LED_Ctrl related to wireless power efficiency received from the second controller 127.

Figure 5B:
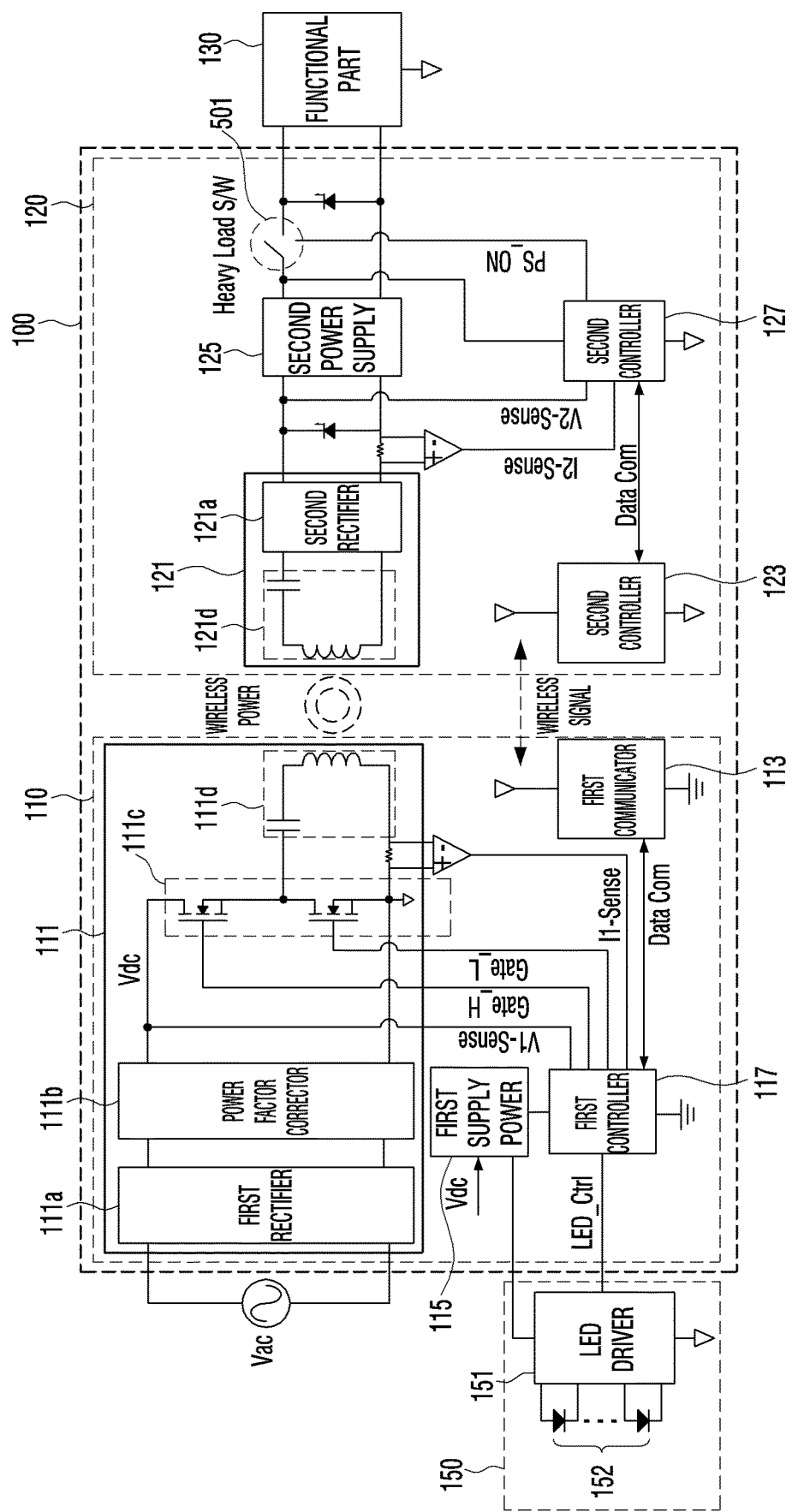
FIG. 5B is a block diagram illustrating an example configuration of a wireless power system according to another embodiment.

FIG. 5B is a block diagram illustrating an example configuration of a wireless power system according to another embodiment.

In FIG. 5B, other components except for a user interface 150 are the same as or similar to those of FIG. 5A, and thus redundant descriptions thereof may not be repeated here.

In FIG. 5B, the first electronic device 10 may include a user interface 150.

The user interface 150 is similar to the user interface 140 of FIG. 5A and may include an LED driver 151 and a plurality of LEDs 152. In this case, the LED driver 151 may control at least one of the plurality of LEDs 152 to be turned on based on the control signal LED_Ctrl related to wireless power efficiency received from the first controller 117.

A user may adjust arrangement of at least one of the first electronic device 10 or the second electronic device 20 such that the wireless power transmission coil 12 of the wireless power transmitting device 110 and the wireless power reception coil 22 of the wireless power receiving device 120 are aligned with each other based on the number of a plurality of LEDs 152 which are turned on.

In various embodiments, both the first electronic device 10 and the second electronic device 20 may include the user interfaces 140 and 150. In this case, the user may adjust arrangement of at least one of the first electronic device 10 or the second electronic device 20 such that the wireless power transmission coil 12 of the wireless power transmitting device 110 and the wireless power reception coil 22 of the wireless power receiving device 120 are arranged with each other with reference to the user interfaces 140 and 150 in one direction based on the structure.

Figure 6:
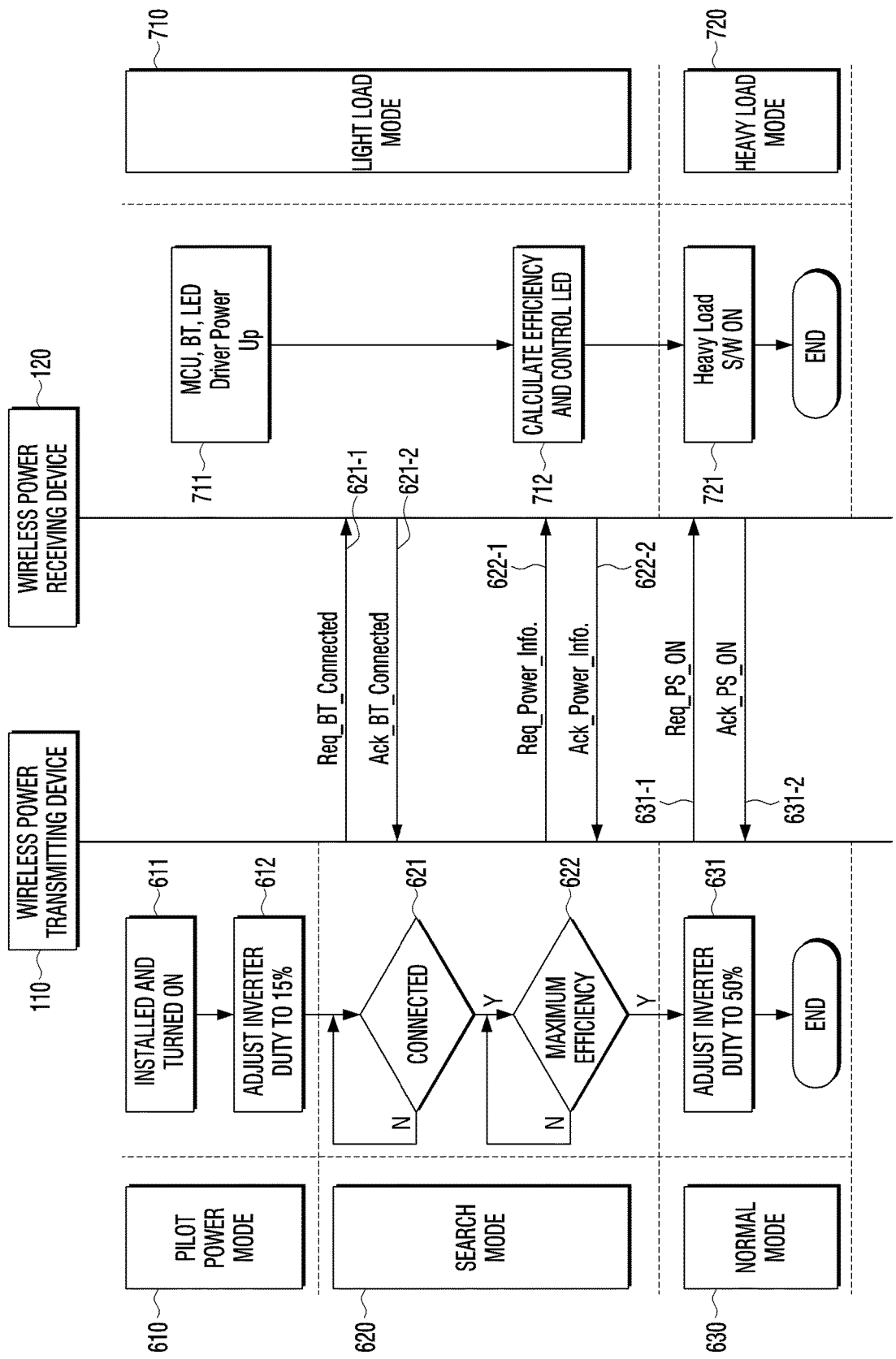
FIG. 6 is a flow diagram illustrating an example operation of a wireless power system according to an embodiment.

FIG. 6 is a flow diagram illustrating an example operation of a wireless power system according to an embodiment.

In FIG. 6, the wireless power transmitting device 110 and the wireless power receiving device 120 may communicate with each other and exchange a power value of the wireless power transmitting device 110 and a power value (e.g., voltage×current) of the wireless power receiving device 120 with each other and either side may provide the power value thereof to the counterpart to calculate wireless power efficiency and obtain the calculated wireless power efficiency.

For example, the first controller 117 of the wireless power transmitting device 110 may calculate power of the wireless power transmitting device 110 based on signal values measured at V1_sense and I1_sense of FIG. 5A or 5B and transmit a power value regarding the calculated power to the wireless power receiving device 120. In addition, the second controller 127 of the wireless power receiving device 120 may calculate power of the wireless power receiving device 120 based on signal values measured at V2 sense and I2 sense of FIG. 5A or 5B and transmit a power value regarding the calculated power to the wireless power transmitting device 110.

In this example, the wireless power transmitting device 110 or the wireless power receiving device 120 may calculate the wireless power efficiency using the power value measured by themselves and the power value received from the counterpart to obtain the calculated wireless power efficiency. For example, the calculated value of the wireless power efficiency may be maximized and/or improved in a situation where the position of the wireless power transmitting device 110 and the position of the wireless power receiving device 120 are aligned with each other.

In FIG. 6, the wireless power transmitting device 110 may include a pilot power mode 610, a search mode 620, and a normal mode 630 in consideration of the amount of power to be supplied and an operation situation. The wireless power receiving device 120 may include a light load mode 710 and a heavy load mode 720 in consideration of a load amount connected to the wireless power receiving device 120. In the pilot power mode 610 and the search mode 620, the wireless power transmitting device 110 may provide initiating power required for the light load mode 710 of the wireless power receiving device 120. For example, in the pilot power mode 610, the wireless power transmitting device 110 may provide power necessary for the alignment of the wireless power system 100 to the wireless power receiving device 120. In the normal mode 630, driving power required for the heavy load mode 720 of the wireless power receiving device 120 may be provided. For example, in the normal mode 630, the wireless power transmitting device 110 may provide the wireless power receiving device 120 with driving power necessary for the operation of the wireless power receiving device 120 and the functional part 130.

For example, in the pilot power mode 610, the wireless power transmitting device 110 may provide the wireless power receiving device 120 with initiating power for the alignment of the wireless power system 100. In this example, because the heavy load switch 501 is turned off, power cannot be supplied to the functional part 130 of the second electronic device 20, and thus, a load amount of the wireless power receiving device 120 may be low. In this example, the wireless power receiving device 120 may operate the wireless power receiver 121, the second power supply 125, the second controller 127, the user interface 140, and the second communicator 123 using the provided initiating power (711).

In the pilot power mode 610, excessive EMI that may occur due to a leakage magnetic field when the wireless power transmitting device 110 transmits excessive power to the wireless power receiving device 120 in a state where the wireless power system 100 is not properly aligned may be prevented and/or reduced. In addition, if the wireless power transmitting device 110 supplies too little power to the wireless power receiving device 120, a malfunction (e.g., a hang-up phenomenon) may occur in a circuit of the wireless power receiving device 120, leading to a situation in which the wireless power receiving device 120 may operate if power of the wireless power transmitting device 110 is turned off and turned on again. In this example, such a malfunction of the wireless power receiving device 120 may be prevented and/or avoided if an appropriate level of initiating power is provided to the wireless power receiving device 120 in the pilot power mode 610.

In the pilot power mode 610, the wireless power receiving device 120 may adjust the amount of wireless power provided to the wireless power transmitting device 110 by adjusting a duty ratio of the inverter 111c.

For example, when the first electronic device 10 is installed and turned on (611) by power supplied thereto in the pilot power mode 610, the first controller 117 may adjust the duty ratio of the inverter 111c to be lowered (about 15% or less) (612). For example, the wireless power transmitting device 110 may adjust the duty ratio of the inverter 111c through Gate_H and Gate_L signals of FIG. 5A or 5B. For example, the wireless power transmitting device 110 may adjust the duty ratio of the inverter 110c according to an asymmetric duty control method of decreasing ON time of an upper switching transistor (e.g., high side MOSFET) through the Gate_H signal and increasing ON time of a lower switching transistor (e.g., low side MOSFET) through the Gate_L signal.

Figure 7A:
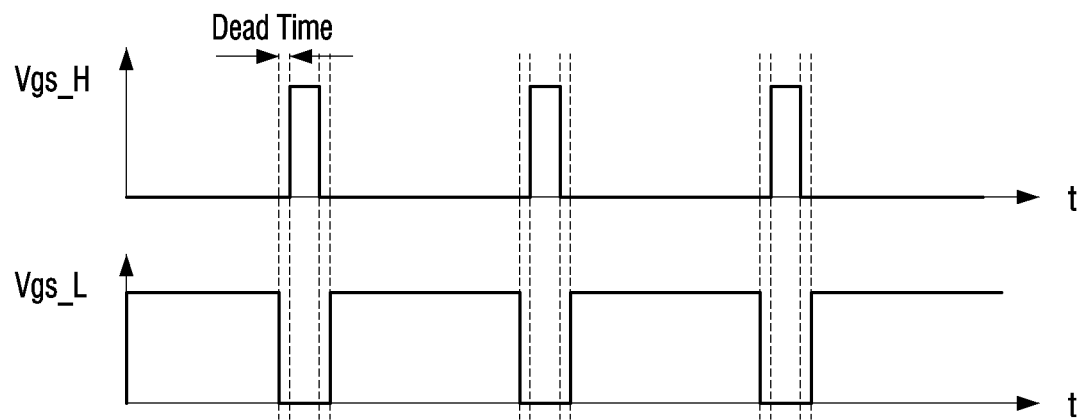
FIGS. 7A and 7B are diagrams illustrating example waveforms according to duty ratios of an inverter according to an embodiment.
Figure 7B:
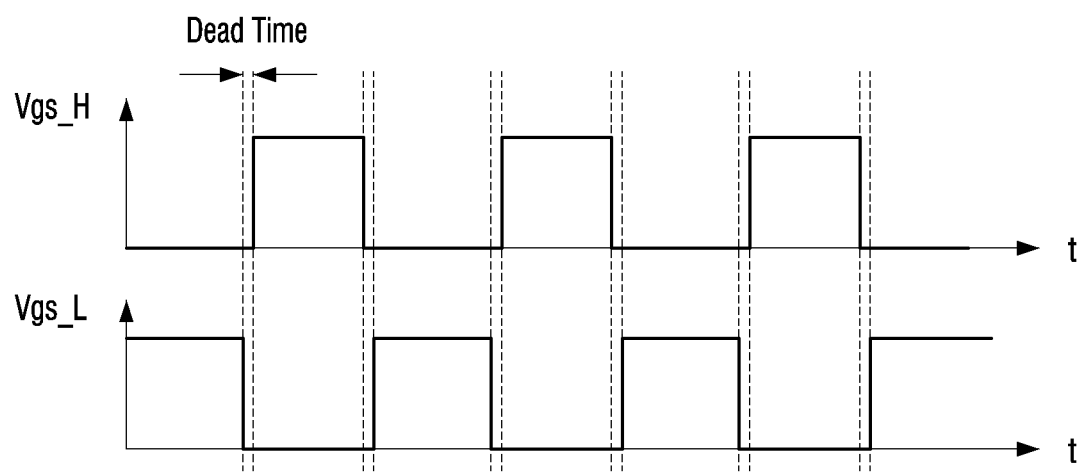

Referring to FIGS. 7A and 7B, FIG. 7A shows a waveform when the duty ratio of the inverter 111c is set to 15%, and FIG. 7B shows a waveform when the duty ratio of the inverter 111c is set to 50%. In a situation where the duty ratio of the inverter 111c is set to 15% as shown in FIG. 7A, the wireless power transmitting device 110 may provide initiating power for operations of the wireless power receiving device 120 and the user interface 140 to the wireless power receiving device 120. When the duty ratio of the inverter 111c is set to 50% as shown in FIG. 7B, the wireless power transmitting device 110 may provide the wireless power receiving device 120 with driving power required for the operation of the functional part 130.

According to the disclosure, it is possible to adjust the duty ratio of the inverter 111c without changing a resonance frequency, and thus, resonance points of the wireless power transmitting device 110 and the wireless power receiving device 120 may be maintained to be the same. In addition, an additional DC-DC inverter circuit for the purpose of varying an output voltage of the inverter 111c is unnecessary, thereby reducing an additional cost required for voltage regulation.

In the search mode 620, the first communicator 113 may determine whether it is connected for communication with the second communicator 123 through a local area network (e.g., Bluetooth) (621). For example, when the first communicator 113 transmits a Bluetooth connection request signal Req_BT Connected to the second communicator 123 (621-1) and receives a Bluetooth connection response signal ACK_BT_Connected from the second communicator 123 (621-2), the first communicator 113 may determine that it is connected for communication with the second communicator 123.

When the first communicator 113 and the second communicator 123 are connected to each other, the wireless power transmitting device 110 or the wireless power receiving device 120 may exchange power values thereof with each other or either side may provide the power value thereof to the counterpart so that wireless power efficiency between the wireless power transmitting device 110 and the wireless power receiving device 120 may be calculated.

In this example, in order to find the maximum wireless power efficiency, alignment may be required between the wireless power transmitting device 110 and the wireless power receiving device 120 as described above with reference to FIGS. 3 and 4. In this process, when the wireless power transmitting device 110 transmits a power value to the wireless power receiving device 120 (622-1), the second controller 127 may calculate wireless power efficiency using the power value measured in the wireless power receiving device 120 together to obtain a wireless power efficiency value as a calculation result (712). The second controller 127 may transmit a control signal to a controller 141 (e.g., an LED driver) of the user interface 140 of the second electronic device 20 according to the calculated wireless power efficiency value (712).

The LED driver 141 may adjust a flickering level of the plurality of LEDs 142 according to a control signal. For example, in the light load mode 710, when the initiating power is supplied to the wireless power receiving device 120, the LED driver 141 may control at least one of the plurality of LEDs 142 to start flickering. As wireless power efficiency is improved, the LED driver 141 may gradually increase the number of LEDs to be turned on. Thereafter, when the LED driver 141 turns on all of the plurality of LEDs 142, the user may determine that the alignment between the wireless power transmitting device 110 and the wireless power receiving device 120 is completed. For example, the user may adjust the arrangement of the first electronic device 10 or the second electronic device 20, while checking a lighting level of the plurality of LEDs 142, to align the wireless power transmitting device 110 and the wireless power receiving device 120.

When the wireless power efficiency value obtained by the wireless power receiving device 120 is transmitted to the wireless power transmitting device (622-2), the wireless power transmitting device 110 may determine whether a wireless power value indicates maximum efficiency based on the efficiency value received through the first communicator 113 (622). When it is determined that wireless power is transmitted with maximum efficiency according to the alignment between the wireless power transmitting device 110 and the wireless power receiving device 120, the wireless power transmitting device 110 may enter the normal mode 630.

In the normal mode 630, the wireless power transmitting device 110 may provide driving power required for the heavy load mode 720 of the wireless power receiving device 120. For example, in the normal mode 630, the wireless power transmitting device 110 may transmit driving power required for the operation of the wireless power receiving device 120 and the functional part 130.

For example, the wireless power transmitting device 110 may transmit a switch-ON request signal Req_PS_ON to the wireless power receiving device 120 to request the heavy load switch 501 to be turned on through the first communicator 113 (631-1). Upon receiving the control signal through the second communicator 127, the second controller 127 of the wireless power receiving device 120 may turn on the heavy load switch 501 according to a switch_ON signal PS_ON (721). When the heavy load switch 501 is turned on, the second controller 127 may transmit a switch-ON response signal Ack_PS_ON to the wireless power transmitting device 110 through the second communicator 123 (631-2). Upon receiving the switch-ON response signal AckK_PS_ON through the first communicator 113, the first controller 117 may gradually increase the duty ratio of the inverter 111c to 50%. As the driving power is supplied to the functional part 130, the second electronic device 20 may operate normally.

Figure 8:
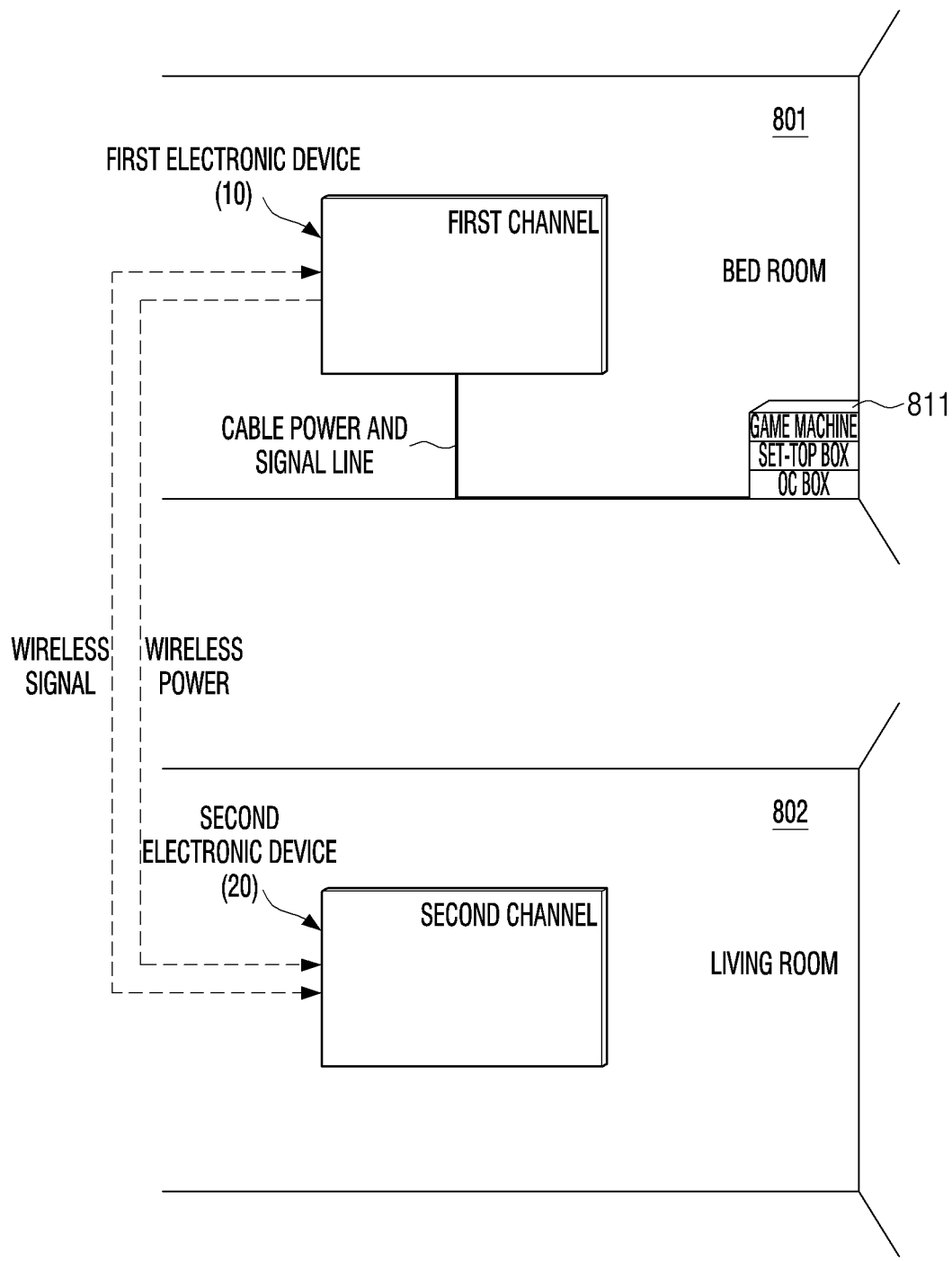
FIG. 8 is a diagram illustrating an example display system according to an embodiment.

FIG. 8 is a diagram illustrating an example display system according to an embodiment of the disclosure.

In FIG. 8, the first electronic device 10 and the second electronic device 20 are display devices, and the first electronic device 10 may be located at a first location 801 and the second electronic device 20 may be located at a second location 802.

In this example, the first electronic device 10 may receive image data from a peripheral device 811. The first electronic device 10 may transmit the received image data to the second electronic device 20. For example, the first electronic device 10 may transmit a wireless signal including the image data to the second electronic device 20 according to a short-range wireless communication scheme (e.g., Bluetooth, NFC, Wi-Fi, etc.).

In this example, because the second electronic device 20 obtains the image data through the first electronic device 10, the peripheral device 811 may be unnecessary. Thus, a fine view and space utilization of the second location 802 may be improved. In addition, because power required by the second electronic device 20 may be supplied from the wireless power transmitting device 110 of the first electronic device 10 according to an embodiment of the disclosure, a separate wiring for receiving power is not necessary, further improving the fine view of the second location 802. If the second location 802 is outside, a risk of electric shock may be minimized and/or reduced, and thus safety of the user may also be improved.

In various embodiments, the first electronic device 10 or the second electronic device 20 may be an advertising display device. In this example, different advertisements may be provided in consideration of characteristics of a person located in the first location 801 and characteristics of a person located in the second location 802. For example, when a camera is provided in each of the first electronic device 10 and the second electronic device 20, each of the first electronic device 10 and the second electronic device 20 may analyze an image obtained through the camera and provide different advertisements according to a gender and age of the persons.

Figure 9:
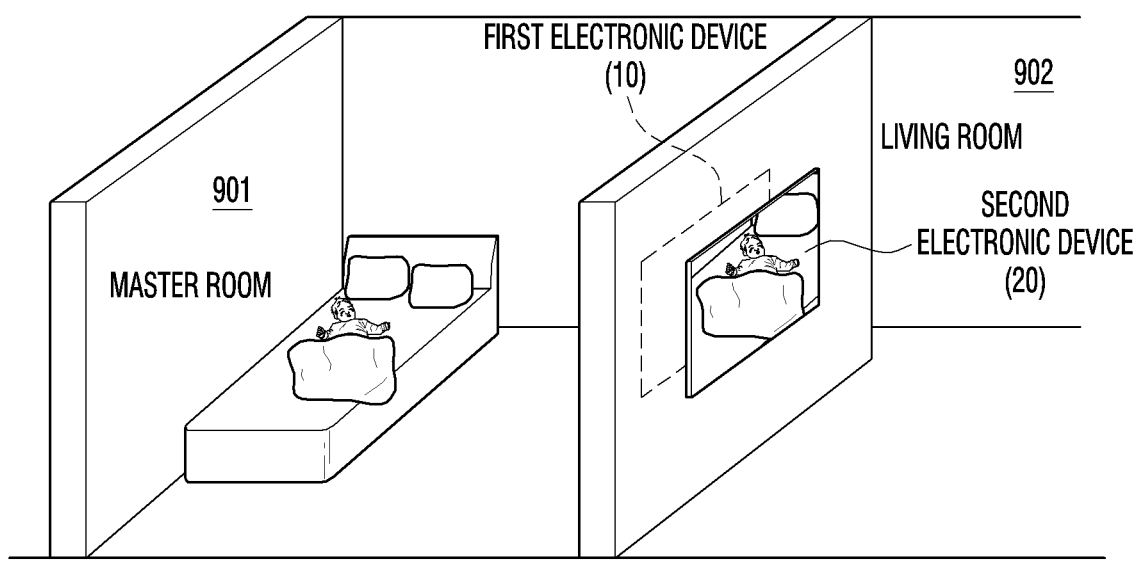
FIG. 9 is a diagram illustrating an example monitoring system according to an embodiment.

FIG. 9 is a diagram illustrating an example monitoring system according to an embodiment of the disclosure.

In FIG. 9, the first electronic device 10 is a sensor device, the second electronic device 20 may be a display device, the first electronic device 10 may be located at a first location 901, and the second electronic device 20 may be located at a second location 902. When the first electronic device 10 includes a camera or a microphone, the second electronic device 20 may provide a situation of the first location 901 to the user according to a user request.

FIG. 10 is a flowchart illustrating an example process of providing a child care service using the system of FIG. 9 according to an embodiment.

The second electronic device 20 may turn on a monitoring function based on a user request in operation 1001. In addition, the first electronic device 10 may operate a camera or a microphone.

The first electronic device 10 may detect a dangerous situation based on information recognized, for example, through the camera or the microphone in operation 1003. If the dangerous situation (e.g., a child is crying) is detected, the second electronic device 20 may provide a user interface inquiring whether to check the dangerous situation to the user in operation 1005. For example, the second electronic device 20 may display a notification window including a check button inquiring whether to check the first location 901.

When the user requests checking in operation 1007, the second electronic device 20 may request information on the first location 901 from the first electronic device 10. The first electronic device 10 may wirelessly transmit information on the first location 901 obtained using a sensor to the second electronic device 20. The information on the first location 901 may include, for example, image data of the first location 901 obtained by the camera and audio data of the first location 901 recorded by the microphone.

Upon receiving the information on the first location 901, the second electronic device 20 may provide information on the first location (e.g., behind a wall where the second electronic device 20 is located) to the second electronic device 20 in operation 1009. In this example, the second electronic device 20 may be switched to a transparent mode having an effect that the first location 901 is visible through the wall to provide information on the first location 901 in operation 1011.

Figure 11A:
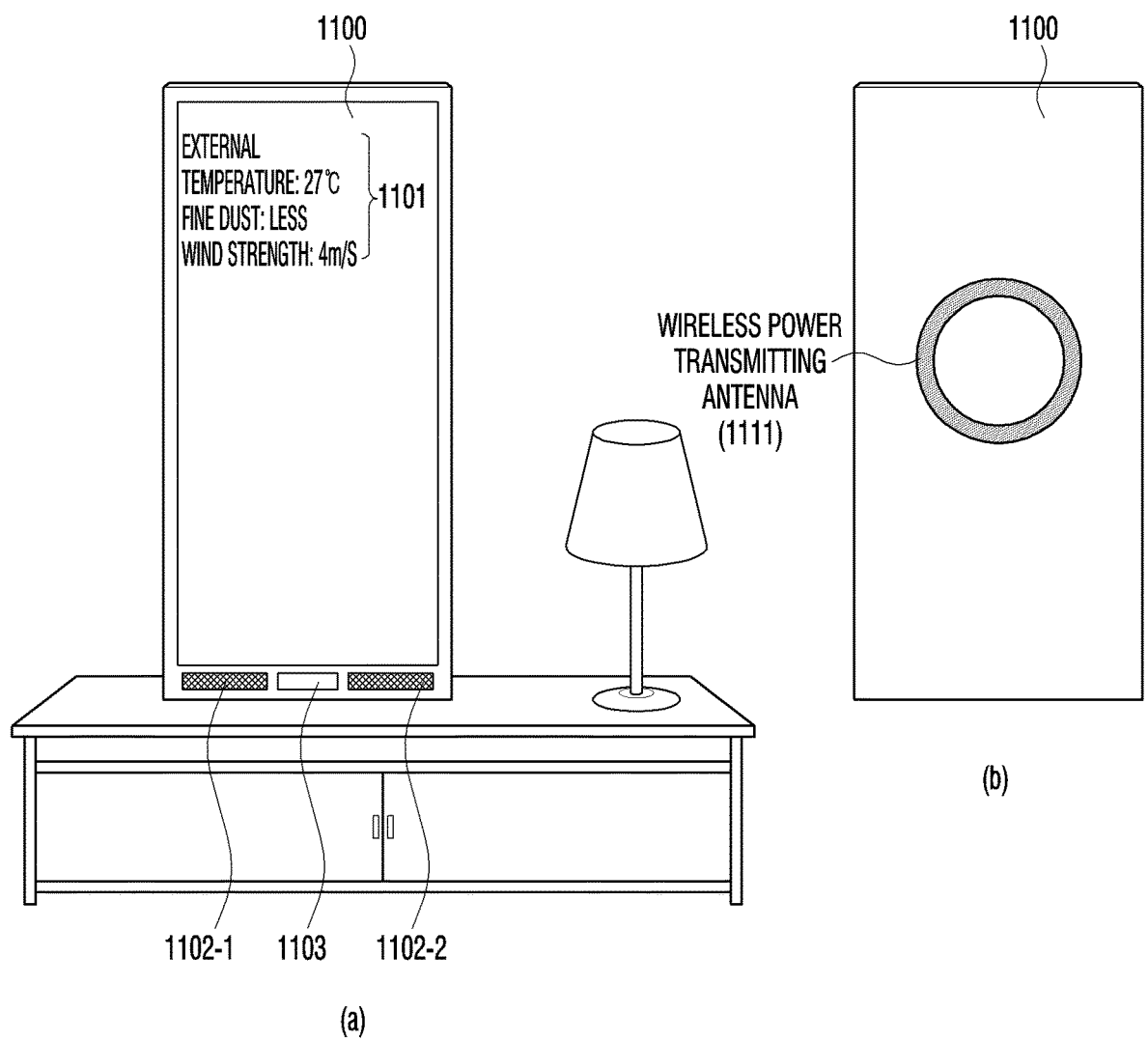
FIG. 11A is a diagram illustrating an example smart window system according to an embodiment.
Figure 11B:
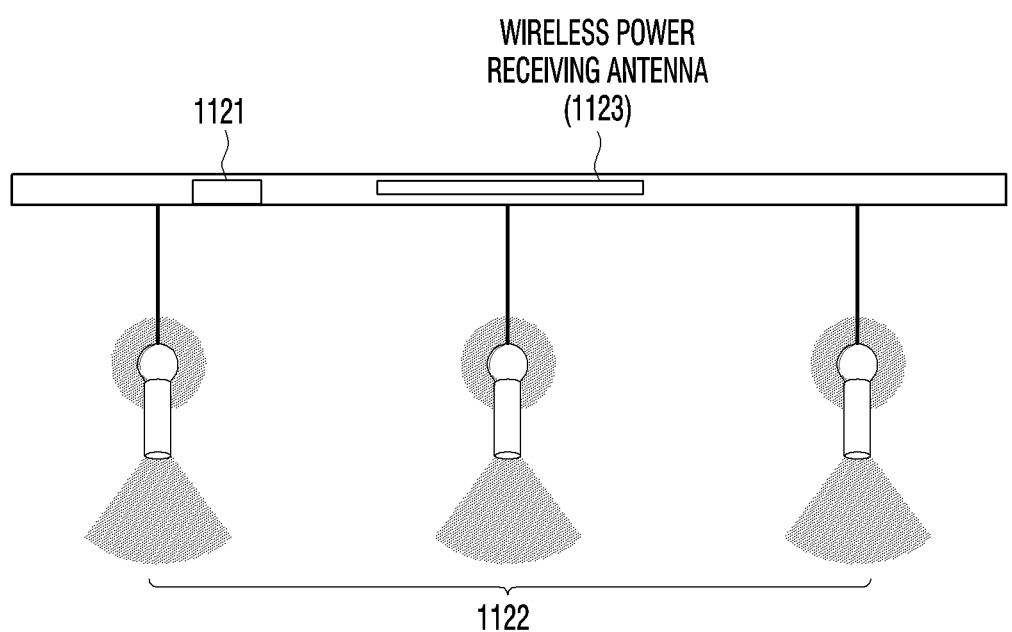
FIG. 11B is a diagram illustrating an example smart window system according to an embodiment.

FIGS. 11A and 11B are diagram illustrating an example smart window system according to another embodiment of the disclosure.

FIG. 11A illustrates an indoor display device 1100 serving as a smart window and FIG. 11B illustrates an outdoor sensor device 1121, a lighting device 1122, and the like.

In FIGS. 11A and 11B, the smart window 1100 may receive power from a wall power source and supply wireless power to the outdoor sensor device 1121 and the lighting device 1122. Accordingly, a wiring for driving the sensor device 1121 and the lighting device 1122 is unnecessary, and thus, a short circuit may be minimized and/or reduced in bad weather conditions (e.g., when raining or snowing) and no wiring may improve the outdoor aesthetics.

As shown in (b) of FIG. 11A, the smart window 1100 may include a wireless power transmitting antenna 1111 and provide wireless power to the sensor device 1121 and the lighting device 1122 provided outdoors. Accordingly, a wireless power receiving antenna 1123 of FIG. 11B may receive the wireless power and supply power to the sensor device 1121 and the lighting device 1122. Various sensors included in the sensor device 1121 (e.g., a temperature sensor, a light amount sensor, a humidity sensor, a fine dust sensor, a wind speed sensor, etc.) may transmit the sensed outdoor information to the smart window 1100 using the supplied power.

The indoor smart window 1100 may display outdoor information 1101 obtained from the sensor device 1121 as shown in (a) of FIG. 11A. The outdoor information 1101 may include, for example, and without limitation, at least one of an external temperature, the amount of sunshine, a fine dust state, a wind strength, or the like. In addition, the smart window 1100 may include speakers 1102-1 and 1102-2 to serve as a sound providing device and include a home button 1103 to turn on or turn off an outdoor lighting device 1122.

When the sensor device 1121 is equipped with a camera, the smart window 1100 may display an image of an outdoor environment captured using the camera through the display like the transparent mode of the second electronic device 20 of FIG. 9.

Figure 12:
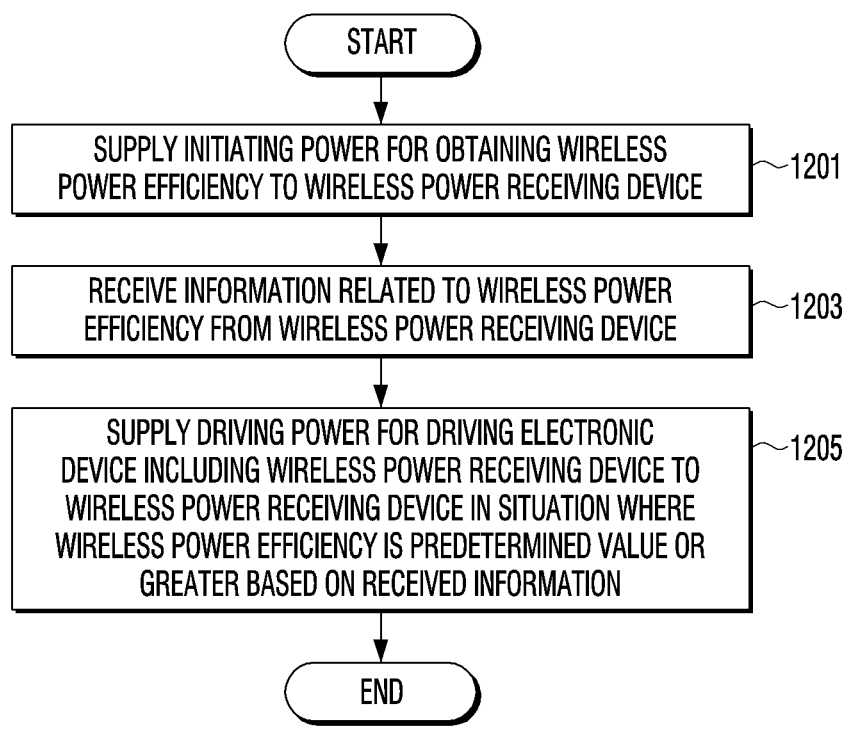
FIG. 12 is a flowchart illustrating an example operation of a wireless power transmitting device according to an embodiment.

FIG. 12 is a flowchart illustrating an example operation of a wireless power transmitting device according to an embodiment of the disclosure.

In operation 1201, the wireless power transmitting device 110 may supply initiating power for obtaining wireless power efficiency to the wireless power receiving device 120. For example, the wireless power transmitting device 110 may supply the initiating power to the wireless power receiving device until the wireless power efficiency reaches a predetermined value or greater to prevent and/or reduce a leakage magnetic field.

In operation 1203, the wireless power transmitting device 110 may receive information related to wireless power efficiency from the wireless power receiving device.

In operation 1205, the wireless power transmitting device 110 may supply driving power for driving the second electronic device 20 including the wireless power receiving device 120 to the wireless power receiving device 120 in a situation where the wireless power efficiency is the predetermined value or greater based on the received information. For example, the wireless power transmitting device 110 may supply the driving power to the wireless power receiving device 120 when the wireless power efficiency is the predetermined value or greater as the wireless power transmission coil 12 included in the wireless power transmitting device and the wireless power reception coil 22 included in the wireless power receiving device 120 are aligned.

In various embodiments, when the wireless power transmitting device 100 supplies the initiating power or the driving power, the wireless power transmitting device 100 may supply the initiating power or the driving power to the wireless power receiving device 120 by adjusting the duty ratio of the inverter 111c.

Figure 13:
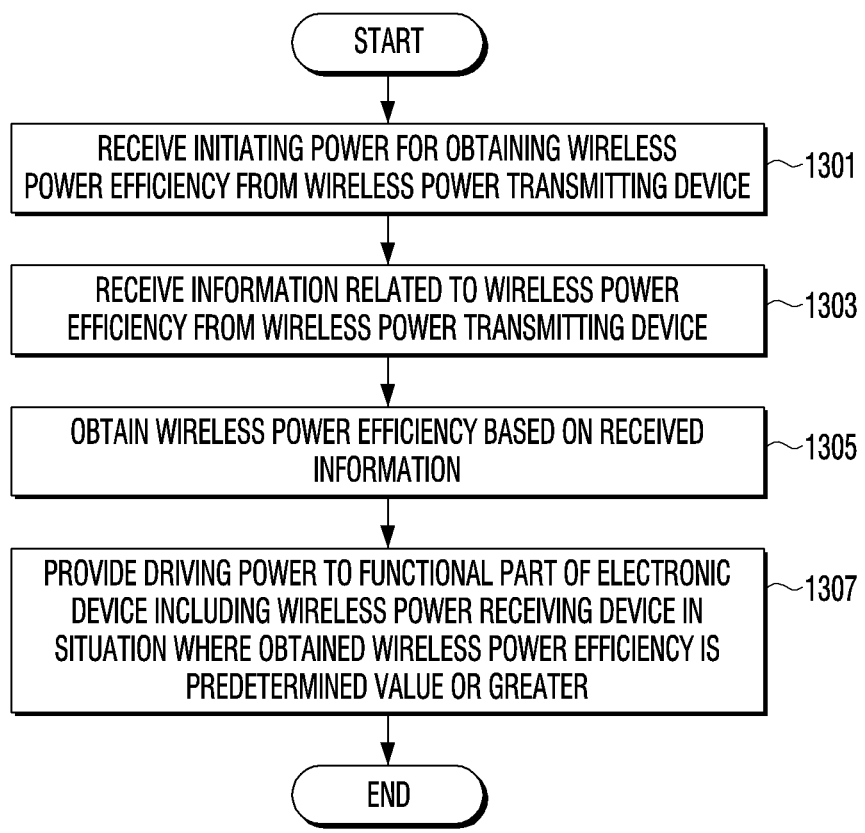
FIG. 13 is a flowchart illustrating an example operation of a wireless power receiving device according to an embodiment.

FIG. 13 is a flowchart illustrating an example operation of a wireless power receiving device according to an embodiment of the disclosure.

In operation 1301, the wireless power receiving device 120 may receive the initiating power for obtaining wireless power efficiency from the wireless power transmitting device.

In operation 1303, the wireless power receiving device 120 may receive information related to wireless power efficiency from the wireless power transmitting device.

In operation 1305, the wireless power receiving device 120 may obtain wireless power efficiency based on the received information.

In operation 1307, the driving power may be provided to the functional part 130 of the second electronic device 20 including the wireless power receiving device 120 in a situation where the obtained wireless power efficiency is the predetermined value or greater. In this example, when the wireless power efficiency is the predetermined value or greater as the wireless power transmission coil included in the wireless power transmitting device 110 and the wireless power reception coil included in the wireless power receiving device 120 are aligned, the wireless power receiving device 120 may provide driving power to the functional part 130 of the second electronic device 20. For example, the wireless power receiving device 120 may turn on a heavy load switch between the wireless power receiving device 120 and the functional part 130 and provide driving power to the functional part 130 of the second electronic device 20.

As used herein, the term "module" may include a unit implemented in hardware, software, firmware, or any combinations thereof, and may interchangeably be used with other terms, for example, "logic," "logic block," "pall," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine (e.g., first electronic device 10) or second electronic device 20). For example, a processor of the machine (e.g., first electronic device 10 or second electronic device 20) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device and a signal (e.g., electromagnetic wave) may not be included, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the various example embodiments have been illustrated and described with reference to the figures, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:
1. A display device comprising:
 a communicator comprising communication circuitry configured to communicate with a wireless power receiving device included in another display device;
 a wireless power transmitter configured to supply wireless power to the wireless power receiving device; and
 a first controller configured to control the display device to:
  control the wireless power transmitter to supply initiating power having a first duty ratio for obtaining wireless power efficiency to the wireless power receiving device,
  control the wireless power transmitter to supply driving power having a second duty ratio greater than the first duty ratio without modifying a resonance frequency used to supply the initiating power for driving the other display device including the wireless power receiving device to the wireless power receiving device based on the wireless power efficiency being a predetermined value or greater based on information received from the wireless power receiving device through the first communicator, and
  control the communicator to transmit image data to the other display device,
 wherein the display device is disposed on a first surface of a structure, and
 wherein the other display device including the wireless power receiving device is disposed on a second surface of the structure, the second surface being different from the first surface.

2. The display device as claimed in claim 1, wherein the first controller is configured to control the wireless power transmitter to supply the initiating power to the wireless power receiving device until the wireless power efficiency reaches the predetermined value or greater to prevent and/or reduce a leakage magnetic field.

3. The display device as claimed in claim 1, wherein the first controller is configured to control the wireless power transmitter to supply the driving power to the wireless power receiving device based on the wireless power efficiency being equal to or greater than the predetermined value based on alignment of a wireless power transmission coil included in the display transmitting device and a wireless power reception coil included in the wireless power receiving device.

4. The display device as claimed in claim 1, wherein the first controller is configured to control the initiating power and/or the driving power to be supplied to the wireless power receiving device by adjusting a duty ratio of an inverter included in the wireless power transmitter.

5. The display device as claimed in claim 1, wherein the information received from the wireless power receiving device includes a wireless power efficiency value between the wireless power receiving device and the wireless power transmitting device.

6. A display device comprising:
 a display panel;
 a communicator comprising communication circuitry configured to communicate with a wireless power transmitting device included in another display device;
 a wireless power receiver configured to receive wireless power from the wireless power transmitting device; and
 a controller configured to control the display device to:
  receive, using the wireless power receiver, initiating power having a first duty ratio for obtaining wireless power efficiency from the wireless power transmitting device,
  obtain wireless power efficiency based on information received by the wireless power receiver through the communicator and the initiating power received by the wireless power receiver, transmit the obtained wireless power efficiency to the wireless power transmitting device through the communicator, based on the obtained wireless power efficiency being a predetermined value or greater, receive, using the wireless power receiver, driving power having a resonance frequency used to supply the initiating power from the wireless power transmitting device and a second duty ratio greater than the first duty ratio, and provide the driving power output from the wireless power receiver to the display panel, control the communicator to receive image data from the other display device, display the received image data on the display panel, wherein the other display device including the wireless power transmitting device is disposed on a first surface of a structure, and wherein the display device is disposed on a second surface of the structure, the second surface being different from the first surface.

7. The display device as claimed in claim 6, wherein the controller is configured to control the driving power through the wireless power receiver to the display panel based on the wireless power efficiency being equal to or greater than the predetermined value based on alignment of a wireless power transmission coil included in the wireless power transmitting device and a wireless power reception coil included in the display device.

8. The display device as claimed in claim 6, wherein the information received by the display device includes a power value of the wireless power transmitting device.

9. The display device as claimed in claim 6, wherein the controller is configured to control a heavy load switch between the display device and the display panel to provide the driving power to the display panel.

10. The display device as claimed in claim 9, wherein the controller is configured control a switch between the wireless power receiver and the display panel to provide the driving power to the display panel as a control signal for turning on the heavy load switch received from the wireless power transmitting device through the communicator.

11. The display device as claimed in claim 6, wherein the controller is configured to transmit a control signal related to the obtained wireless power efficiency to a user interface providing the wireless power efficiency information.

12. The display device as claimed in claim 11, wherein the user interface is configured to provide the wireless power efficiency information using a plurality of light emitting diodes (LEDs).

13. A method of supplying power using a display device, the method comprising:

supplying initiating power having a first duty ratio for obtaining wireless power efficiency to a wireless power receiving device included in another display device;

receiving information related to the wireless power efficiency from the wireless power receiving device;

supplying driving power having a second duty ratio greater than the first duty ratio without modifying a resonance frequency used to supply the initiating power for driving the other display device including the wireless power receiving device to the wireless power receiving device based on the wireless power efficiency being a predetermined value or greater based on the received information; and transmitting image data to the other display device, wherein the display device is disposed on a first surface of a structure, and wherein the other display device including the wireless power receiving device is disposed on a second surface of the structure, the second surface being different from the first surface.

14. The method as claimed in claim 13, wherein the supplying of the initiating power comprises supplying the initiating power to the wireless power receiving device until the wireless power efficiency reaches the predetermined value or greater to prevent and/or reduce a leakage magnetic field.

15. The method as claimed in claim 13, wherein the supplying of the driving power comprises supplying the driving power to the wireless power receiving device based on the wireless power efficiency being equal to or greater than the predetermined value based on alignment of a wireless power transmission coil included in the display device and a wireless power reception coil included in the wireless power receiving device.

16. The method as claimed in claim 13, wherein the supplying of the initiating power or the driving power comprises supplying the initiating power or the driving power to the wireless power receiving device by adjusting a duty ratio of an inverter.

17. A method of supplying power using a display device, the method comprising:

receiving, using the display device, initiating power having a first duty ratio for obtaining wireless power efficiency from a wireless power transmitting device included in another display device;

receiving information related to wireless power efficiency from the wireless power transmitting device;

obtaining wireless power efficiency based on the received information and the initiating power received using a wireless power receiver included in the display device;

transmitting the obtained wireless power efficiency to the wireless power transmitting device;

based on the obtained wireless power efficiency being a predetermined value or greater, receiving, using the wireless power receiver, driving power having a resonance frequency used to supply the initiating power from the wireless power transmitting device and a second duty ratio greater than the first duty ratio, and providing the driving power to a display panel included in the display device;

receiving image data from the other display device; and displaying the received image data on the display panel, wherein the other display device includes the wireless power transmitting device is disposed on a first surface of a structure, and wherein the display device is disposed on a second surface of the structure, the second surface being different from the first surface.

18. The method as claimed in claim 17, wherein the providing of the driving power to the display panel comprises providing the driving power to the display panel based on the wireless power efficiency being equal to or greater than the predetermined value based on alignment of a wireless power transmission coil included in the wireless power transmitting device and a wireless power reception coil included in the display device.

19. The method as claimed in claim 17, wherein the information related to the wireless power efficiency includes a power value of the wireless power transmitting device.

20. The method as claimed in claim 17, further comprising turning on a heavy load switch between the display device and the display panel to provide the driving power to the display panel.

* * * * *